US009587881B2

(12) United States Patent
Sakaniwa et al.

(10) Patent No.: US 9,587,881 B2
(45) Date of Patent: Mar. 7, 2017

(54) CEMENT PRODUCTION APPARATUS (71) Applicant: MITSUBISHI MATERIALS CORPORATION, Chiyoda-ku (JP)

(72) Inventors: Daisuke Sakaniwa, Naka (JP); Junzhu Wang, Naka (JP); Hirokazu Shima, Naka (JP)

(73) Assignee: MITSUBISHI MATERIALS CORPORATION, Chiyoda-ku (JP)

( * ) Notice: Subject to any disclaimer, the term of this patent is extended or adjusted under 35 U.S.C. 154(b) by 356 days.

(21) Appl. No.: 14/383,274

(22) PCT Filed: Mar. 13, 2013

(86) PCT No.: PCT/JP2013/056980
§ 371 (c)(1),
(2) Date: Sep. 5, 2014

(87) PCT Pub. No.: WO2013/137304
PCT Pub. Date: Sep. 19, 2013

(65) Prior Publication Data
US 2015/0020400 A1    Jan. 22, 2015

(30) Foreign Application Priority Data

Mar. 14, 2012    (JP) ................ 2012-057517

(51) Int. Cl.
*F26B 23/00*    (2006.01)
*C04B 7/43*    (2006.01)
(Continued)

(52) U.S. Cl.
CPC .............. *F26B 23/002* (2013.01); *C04B 7/43* (2013.01); *F27B 7/20* (2013.01); *F27B 7/2025* (2013.01);
(Continued)

(58) Field of Classification Search
CPC ........ F26B 23/002; C04B 7/43; F27B 7/2025; F27B 7/3205; F27B 7/20; Y02P 40/121;
(Continued)

(56) References Cited

U.S. PATENT DOCUMENTS 4,063,875 A    12/1977    Takeuchi
4,191,526 A    3/1980    Triebel

FOREIGN PATENT DOCUMENTS

JP    62-029919 Y2    7/1987
JP    06-191615 A    7/1994
(Continued)

OTHER PUBLICATIONS

International Search Report issued Jun. 18, 2013 in PCT/JP2013/056980 filed Mar. 13, 2013.
(Continued)

*Primary Examiner* — Jiping Lu
(74) *Attorney, Agent, or Firm* — Oblon, McClelland, Maier & Neustadt, L.L.P.

(57) ABSTRACT

To provide a cement production apparatus in which heat-exchanging efficiency can be improved by even pre-heating by supplying material equally to cyclones above a duct and which can perform an operation with low pressure loss and small energy consumption.

A cement production apparatus includes: a duct 21 provided between upper cyclones 13A and a lower cyclone 13B being provided below the upper cyclones 13A, the duct 21 in which the exhaust gas drained from the lower cyclone 13B flows upward, distributing and introducing the exhaust gas to the upper cyclones 13A; a plurality of material-supplying pipes 22 for supplying cement raw material provided on the duct 21 below a distribution part 23 to the plurality of the upper cyclones 13A with a same number of distribution outlets 21a among the upper cyclones 13A; and connection
(Continued)

ports 22*a* of the material-supplying pipes 22 to the duct 21 each provided at each of positions corresponding to swirl flows of the exhaust gas poured into the distribution outlets 21*a*.

7 Claims, 7 Drawing Sheets (51) Int. Cl.
*F27D 17/00* (2006.01)
*F27B 7/20* (2006.01)
*F27B 7/32* (2006.01)

(52) U.S. Cl.
CPC .......... *F27B 7/3205* (2013.01); *F27D 17/004* (2013.01); *F27D 17/008* (2013.01); *F27D 2017/009* (2013.01); *Y02P 40/121* (2015.11)

(58) Field of Classification Search
CPC . F27D 2017/009; F27D 17/004; F27D 17/008
See application file for complete search history.

(56) References Cited

FOREIGN PATENT DOCUMENTS

| JP | 08-119694 A | 5/1996 |
|---|---|---|
| JP | 09-262452 A | 10/1997 |
| JP | 2012-214309 A | 11/2012 |

OTHER PUBLICATIONS

U.S. Appl. No. 14/417,276, filed Jan. 26, 2015, Sakaniwa, et al.
U.S. Appl. No. 14/382,939, filed Sep. 4, 2014, Sakaniwa, et al.
Extended European Search Report issued Oct. 14, 2015 in Patent Application No. 13761224.8.

CEMENT PRODUCTION APPARATUS

BACKGROUND OF THE INVENTION

Field of the Invention

The present invention relates to an apparatus of producing cement clinker by burning cement raw material in a kiln while supplying to a preheater.

Priority is claimed on Japanese Patent Application No. 2012-57517, filed Mar. 14, 2012, the content of which is incorporated herein by reference.

Description of the Related Art

In a cement production apparatus, a preheater is provided for pre-heating cement raw material. The preheater is configured by a plurality of cyclones connected in a vertical direction in which a lowest cyclone is connected to a kiln inlet part of a cement kiln. The cement raw material is pulverized by a mill, and then is supplied to the preheater from a duct connecting a top cyclone and a lower cyclone at a middle position of the preheater. In the preheater, the cement raw material is introduced into the top cyclone being carried by exhaust gas rising from the cement kiln, then fallen into each of the cyclones sequentially so as to be pre-heated by a heat of the exhaust gas, and finally supplied to the cement kiln from a lowermost cyclone.

When the cement raw material is supplied to the duct, since the plurality of cyclones are provided above the duct, it is necessary to supply the material equally in order to pre-heat equally in the cyclones.

As an apparatus which supplies powder such as the cement raw material, there are apparatuses described in Patent Document 1 to Patent Document 3 in which improvement of dispersibility is contrived.

In an apparatus described in Patent Document 1, on an upper surface of a lower-end part of a bottom plate of a material-supplying pipe (i.e., an inclined chute) supplying powder of cement raw material, a mountain-shape protruded part protruding as a probability curve is formed. The protruded part is formed so that a highest part is at a lower-end side and a height at an upper-stream side is zero, so that the material is supplied into a duct being divided to left-and-right by hitting against the protruded part.

In Patent Document 2, a dispersing device of powder material is proposed in which a dispersing plate is provided at a connecting part between a material-supplying pipe (i.e., a charge chute) and a duct so as to be protruded to a half of an inner diameter of the charge chute at a maximum by angular-displacement around a horizontal axis. In Patent Document 3, a device in which a material-slide surface is formed in substantially orthogonal direction to a gas flow at a connecting part between a material-supplying pipe (i.e., a material chute) and a duct (i.e., a heated-gas duct) is disclosed.

In the devices disclosed in Patent Documents 2 or 3, the material is supplied with being dispersed into the duct by hitting against the dispersing plate protruding in the duct or the material-slide surface.

PRIOR ART DOCUMENT

Patent Document

Patent Document 1: Japanese Unexamined Patent Application, First Publication No. H06-191615
Patent Document 2: Japanese Unexamined Patent Application, First Publication No. H09-262452
Patent Document 3: Japanese Examined Utility Model (Registration) Application, Publication No. S62-29919

SUMMARY OF THE INVENTION

Problems to be Solved by the Invention

However, in those devices of Patent Documents, since the protruded part or the dispersing plate are provided for dispersion at the lower end part of the material-supplying pipe or in the duct, it is tend to cause occurring of choking or the like. Moreover, when the dispersing plate is arranged in the duct, the dispersing plate may become resistance to a flow of the exhaust gas rising from below so that a stable operation may be obstructed.

The present invention is achieved in consideration of the above circumstances, and has an object to provide a cement production apparatus in which heat-exchanging efficiency can be improved by even pre-heating by supplying material to cyclones above a duct and which can perform an operation with low pressure loss and small energy consumption.

Means for Solving the Problem

In a duct of a cement production apparatus, exhaust gas from a lower cyclone rises as a swirl flow. If a plurality of distribution outlets among upper cyclones are provided, in the duct, the swirl flows of the exhaust gas is generated according to a number of the distribution outlets. Therefore, as a conventional device, if the material-supplying pipe is one and a connecting port to the duct of the material-supplying pipe is provided so as to be flush with an inner wall surface of the duct, most of the cement raw material flowing into the duct from the material-supplying pipe is drained from the distribution outlets at an upper part of the duct with the swirl flow near the connecting port of the material-supplying pipe of the swirl flows of the exhaust gas. Accordingly, amounts of the cement raw material drained from the distribution outlets provided at the upper part of the duct are biased and not even. In this case, temperature difference of the exhaust gas at the distribution outlets is large; and the heat-exchange efficiency is deteriorated.

As in Patent Document 2, even if the dispersing plate is provided blow the connecting port of the material-supplying pipe, most of the cement raw material is carried by the swirl flow near the inner wall of the duct and drained from one of the distribution outlets if the dispersing plate is provided not to have an enough length to be inserted into the duct.

Therefore, the present invention achieved a solution as below.

A cement production apparatus according to the present invention includes: a plurality of cyclones vertically connected to each other in which exhaust gas generated in a cement kiln flows; a duct provided between the upper cyclones and the lower cyclone being provided below the upper cyclones, the duct in which the exhaust gas drained from the lower cyclone flows upward, distributing and introducing the exhaust gas to the upper cyclones; a plurality of material-supplying pipes for supplying cement raw material provided on the duct below a distribution part among the plurality of the upper cyclones with a same number of distribution outlets among the upper cyclones; and connection ports of the material-supplying pipes to the duct each provided at each of positions corresponding to swirl flows of the exhaust gas poured into the distribution outlets.

Since the number of the distribution outlets among the upper cyclones is coincide with the number of the material-supplying pipes, and since the connecting ports of the material-supplying pipes are arranged at the positions corresponding to the swirl flows generated in the duct, the cement raw material can be equally pre-heated by flowing equally into each of the distribution outlets, so that heat-exchanging efficiency between the exhaust gas and the cement raw material can be improved. Moreover, since it is not necessary to provide dispersing plates and the like in the duct, it is possible to perform an operation with low pressure loss and small energy consumption.

In the cement production apparatus according to the present invention, when the number of the distribution outlets among the upper cyclones is "n", it is possible to employ a structure in which the connecting ports of the material-supplying pipes are arranged around an axis of the duct with being shifted each other by 360°/n; or a structure in which the connecting ports of the material-supplying pipes are arranged with being vertically separated by a prescribed space at one side surface of the duct with the number of "n".

In the cement production apparatus according to the present invention, it is possible to employ aspects as below.

It is preferable that the material-supplying pipes be inclined by an angle of 20° to 50° with respect to an axis of the duct.

It is preferable that the connecting ports of the material-supplying pipes be flush with an inner wall surface of the duct.

In the cement production apparatus according to the present invention, the upper cyclones may be provided with two; and the material-supplying pipes may be connected at positions separated by 180° around the duct.

In the cement production apparatus according to the present invention, when a vertical distance between a horizontal surface passing through centers of the distribution outlets of the upper cyclones and a horizontal surface passing through centers of the connecting ports of the material-supplying pipes is H, and a diameter of the duct is D, it is preferable that a ratio H/D be set to 1.1 to 3.0.

Effects of the Invention

According to the present invention, since cement raw material can flow equally into each of the distribution outlets, pre-heat thereof is equalized so that the heat-exchanging efficiency can be improved. Moreover, since it is not necessary to provide dispersing plates and the like in the duct, it is possible to perform an operation with low pressure loss and small energy consumption.

DETAILED DESCRIPTION OF THE INVENTION

Below, embodiments of a cement production apparatus according to the present invention will be described with reference to the drawings.

Figure 3:
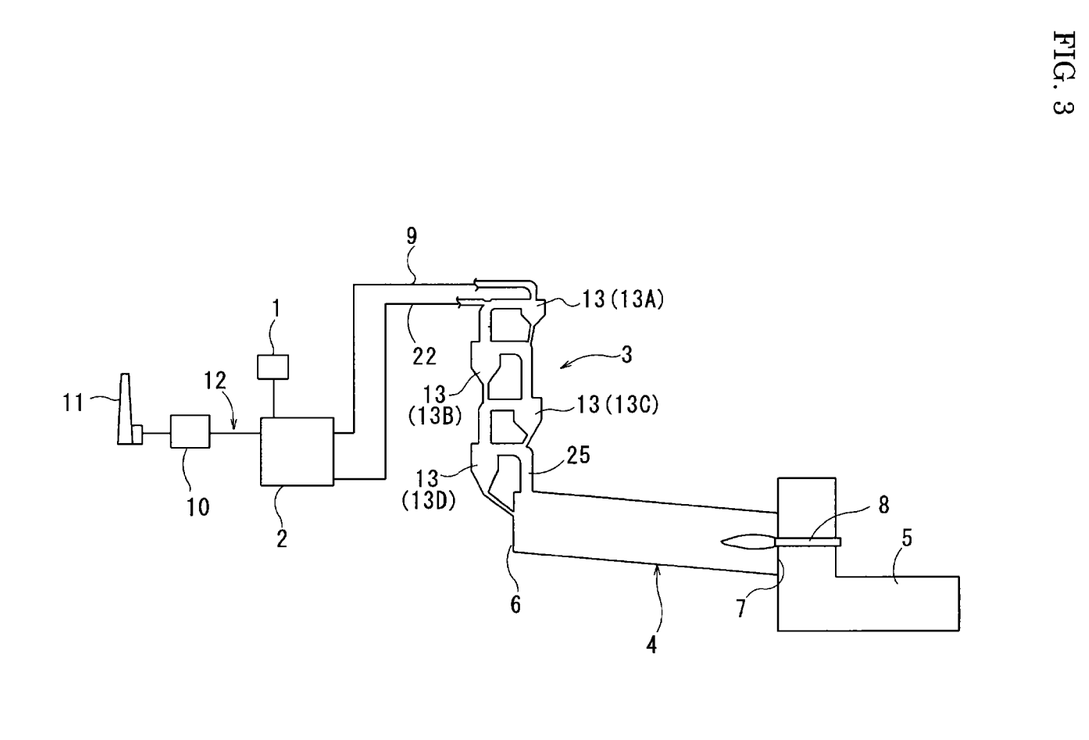
FIG. 3 It is a schematic block diagram generally showing the cement production apparatus.

As generally shown in FIG. 3, a cement production apparatus of a first embodiment is provided with: a material bunker 1 particularly storing limestone, clay, silica, ferrous material and the like as cement raw material; a raw mill-and-dryer 2 milling and drying the cement raw materials; a preheater 3 pre-heating the powdery cement raw material obtained in the raw mill; a cement kiln 4 burning the cement raw material pre-heated by the preheater 3; a cooler 5 to cool cement clinker after burning in the cement kiln 4, and the like.

The cement kiln 4 is a rotary kiln having a lateral-cylindrical shape slightly inclined, in which, by rotating around an axis, while the cement raw material supplied from the preheater 3 to a kiln inlet part 6 is sent to a kiln outlet part 7, cement clinker is generated by heating and burning to about 1450° C. by a burner 8 in the kiln outlet part 7 in the sending process, and then the cement clinker is sent out to the cooler 5 from the kiln outlet part 7. The cement clinker is cooled to prescribed temperature in the cooler 5, and sent to a finishing process.

Exhaust gas which is generated in the cement kiln 4 flows upward in the preheater 3 from a lower part, and then is introduced into the raw mill-and-dryer 2 through an exhaust pipe 9. By the exhaust gas introduced from the cement kiln 4, the raw mill-and-dryer 2 grinds the cement raw material and dries simultaneously. The raw mill-and-dryer 2 is connected to an exhaust-gas line 12 having a dust collector 10, a chimney 11 and the like.

The preheater 3 is constructed by vertically connecting a plurality of cyclones 13 in which the exhaust gas generated in the cement kiln 4 flows therein. A cyclone 13D which is a lowest part of the preheater 3 is connected to the kiln inlet part 6 of the cement kiln 4.

In FIG. 3, the structure of the preheater 3 is simply illustrated. The preheater 3 of the present embodiment is constructed from the cyclones 13 of four vertical stages. In this case, with respect to one cyclone 13B of a third stage, two cyclones 13A of a fourth stage as a top stage (that is to say the upper cyclones in the present invention) are connected in parallel. By providing two cyclones 13B of the third stage in parallel, the cyclones 13A of the top stage are provided by four in total, two to each. The preheater 3 may be made from a different structure from the above-mentioned structure.

Figure 1:
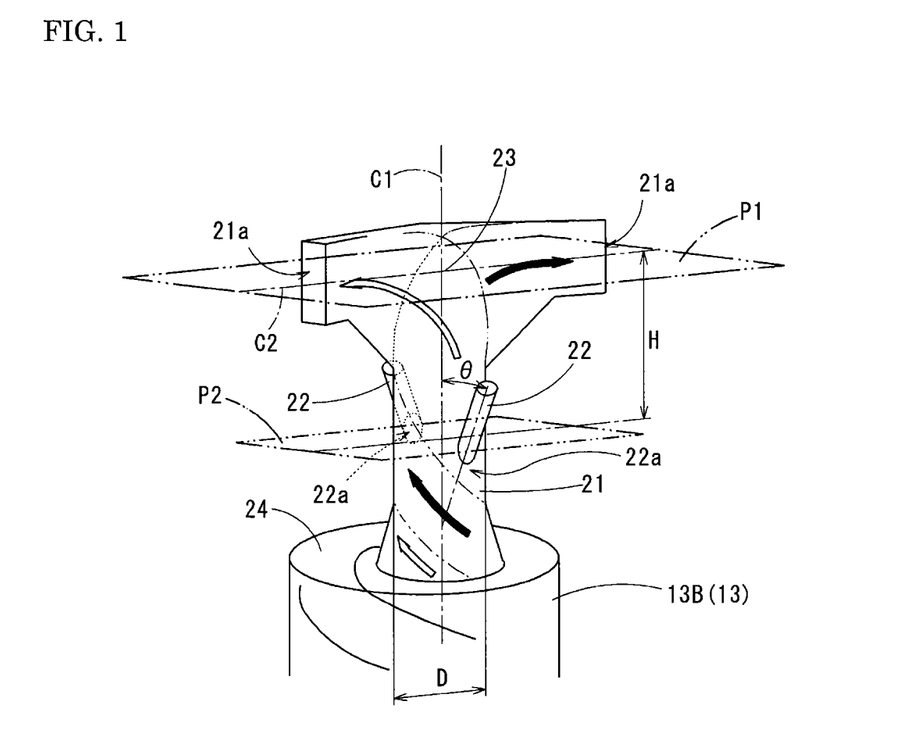
FIG. 1 It is a schematic view sterically showing a flow of exhaust gas in a duct in a first embodiment of a cement production apparatus according to the present invention.

A duct 21 of the preheater 3 connects the cyclones 13A of the top stage which are arranged by two with one of the cyclones 13B of the third stage. To the duct 21, a material-supplying pipes 22 to which the material is supplied from the raw mill-and-dryer 2 are connected. The duct 21 is extended vertically upward from the cyclone 13B of the third stage, and then branched to left-and-right through a distribution part 23, so that distribution outlets 21a are connected to the two upper cyclones 13A respectively. In FIG. 1, the lower cyclone 13B alone is illustrated, the duct 21 is illustrated up to the distribution outlets 21a, and the upper cyclone 13A is omitted.

The material-supplying pipes 22 are connected to the duct 21 at a lower position than the distribution part 23, and an installation number thereof is a same as that of the distribution outlets 21a among the upper cyclones 13A. Connecting positions of the material-supplying pipes 22 are arranged one each on positions corresponding to swirl flows of the exhaust gas flowing into the distribution outlets 21a. When a number of the distribution outlets 21a of the upper cyclones 13A is "n", connecting ports 22A of the material-supplying pipes 22 are arranged around an axis C1 of the duct 21 with being shifted each other by 360°/n.

In the preheater 3 shown in FIG. 1, the two material-supplying pipes 22 are connected, corresponding with the two cyclones 13A of the top stage, at the rotationally-shifted positions by 180° around the axis C1 of the duct 21, so that the connecting ports 22a of the material-supplying pipes 22 are connected at the opposite positions to each other. The connecting ports 22a of the material-supplying pipes 22 opening in the duct 21 are formed to be flush with an inner wall surface of the duct 21. In addition, the connecting ports 22a may be slightly protruded from the inner wall surface of the duct 21; it is not necessary to be strictly flush with the inner wall surface of the duct 21. The distribution part 23 is an intersection point at which the axis C1 of the duct 21 meets a line C2 linking centers of the distribution outlets 21a with each other to both the cyclones 13A of the upper stage (refer to FIG. 1). In FIG. 1, with respect to the line C2 linking the centers of the distribution outlets 21a, the connecting ports 22a of the material-supplying pipes 22 are provided to form substantially 90°. However, the angle is not limited to this: it may be set any angle so that the connecting ports 22a of the material-supplying pipes 22 are arranged with being shifted each other by 360°/n, resulting in supplying the cement raw material to respective swirl flows.

The material-supplying pipes 22 are inclined by a suitable angle θ of 20° to 50° with respect to the axis of the duct 21. The cement raw material is charged by falling with a fixed amount via the material-supplying pipes 22.

In the cement production apparatus constructed as above, when the cement raw material is supplied from the material bunker 1, the cement raw material is milled and dried in the raw mill-and-dryer 2, charged in the preheater 3 from the material-supplying pipe 22, and then supplied to the lower cement kiln 4 while falling in the preheater 3. In the preheater 3, the exhaust gas from the cement kiln 4 flows upward sequentially in the cyclones from the lower part along a counter direction to the cement raw material, so that the cement raw material is pre-heated by the exhaust gas from the cement kiln 4 while passing through the cyclones 13 to prescribed temperature (for example, 900° C.). The pre-heated cement raw material is supplied to the kiln inlet part 6 of the cement kiln 4 from the lowest cyclone 13D.

It will be further described to supply the cement raw material from the material-supplying pipes 22. In the duct 21 to which the material-supplying pipes 22 are connected, the exhaust gas rising from the cyclone 13B of the lower stage (the third stage) flows, so that the cement raw material is introduced into the cyclone 13A of the upper stage (a fourth stage) by being carried by the flow. Meanwhile, the exhaust gas generated by combustion in the cement kiln 4 rises inside the preheater 3 as a swirl flow by the cyclones 13. The cement raw material is supplied from the material-supplying pipes 22 and is dropped into the swirl flow.

Figure 2:
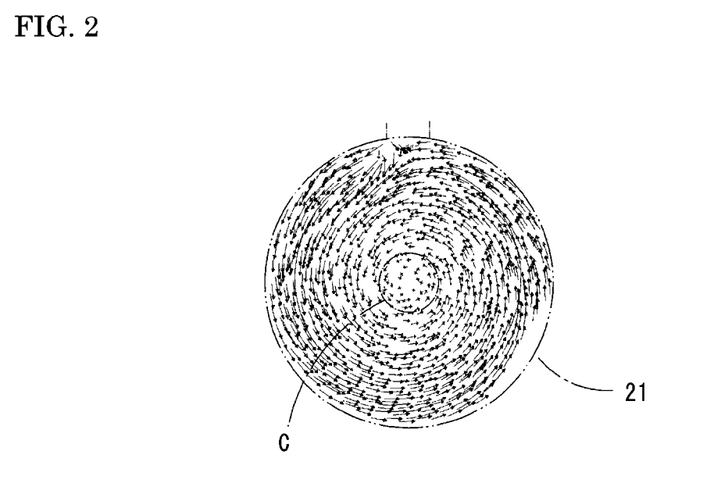
FIG. 2 It is a schematic view showing velocity vectors of a gas flow in a cross sectional direction in the duct.

As shown by velocity vectors in a cross sectional direction in FIG. 2, the swirl flow has large velocity vectors of a circumferential direction in the vicinity of the inner wall surface 21b of the duct 21; and as it approaches a center C of the duct 21, constituents of the circumferential direction becomes small and vertically-upward velocity vectors become large.

As shown in a schematic view shown in FIG. 1, the swirl flow flows from the lower cyclone 13B via the duct 21, is distributed into two at the distribution part 23, and flows into two cyclones 13A of the upper stage respectively. One flow into one of the two cyclones 13A is illustrated by black arrows, and one flow into the other cyclone is illustrated by white arrows. In the duct 21, those rise spirally while twisted. Finally, arriving at the distribution part 23 after rising in the duct 21, those are introduced into the cyclones 13A from the distribution outlets 21a respectively in a state of being branched from the distribution part 23.

As described above, since two flows are the swirl flow spirally rising inside the duct 21, if the cement raw material is dropped to only one flow of them, it is supplied mostly to only one of the two cyclones 13A of the upper stage. As a result, a load is increased only in the cyclone 13A.

In the cement production apparatus according to the present invention, the material-supplying pipes 22 supplying the cement raw material are provided on the duct 21 below the distribution part 23 distributing the exhaust gas from the lower cyclone 13B (of the third stage) and introducing it into the two upper cyclones 13A (of the fourth stage) with the same number of the distribution outlets 21a among the upper cyclones 13A; and the connecting ports 22a to the duct 21 of the material-supplying pipes 22 are each arranged at each of the positions corresponding to swirl flows of the exhaust gas poured into the distribution outlets 21a. Therefore, the dropped material is supplied equally to both the upper cyclones 13A from the distribution part 23 while being carried upward by the swirl flows. In the example shown in FIG. 1, from the material-supplying pipes 22 which are arranged at the opposite positions by 180°, the cement raw material is supplied to the two flows respectively. The cement raw material supplied to the two flows respectively is then supplied to the upper cyclones 13A while being carried by the flows.

As a result, the loads of both the cyclones are balanced, so that respective pre-heating states of the cement raw material supplied to the cyclones can be equalized. When gas-temperature difference between outlets of the cyclones of the top stage of the preheater exceeds 100° C. or more for example, a heat-consumption rate is increased at least 3 kcal/kg-cli or more. By equalizing the pre-heating states as in the apparatus of the present invention, the temperature difference is decreased so that the heat-consumption rate can be reduced. Furthermore, since the connecting ports 22a of the material-supplying pipes 22 are flush with the inner wall surface of the duct 21, there is no resistance to the swirl flows rising from below, and it is possible to perform an operation with low pressure loss and small energy consumption.

Figure 6:
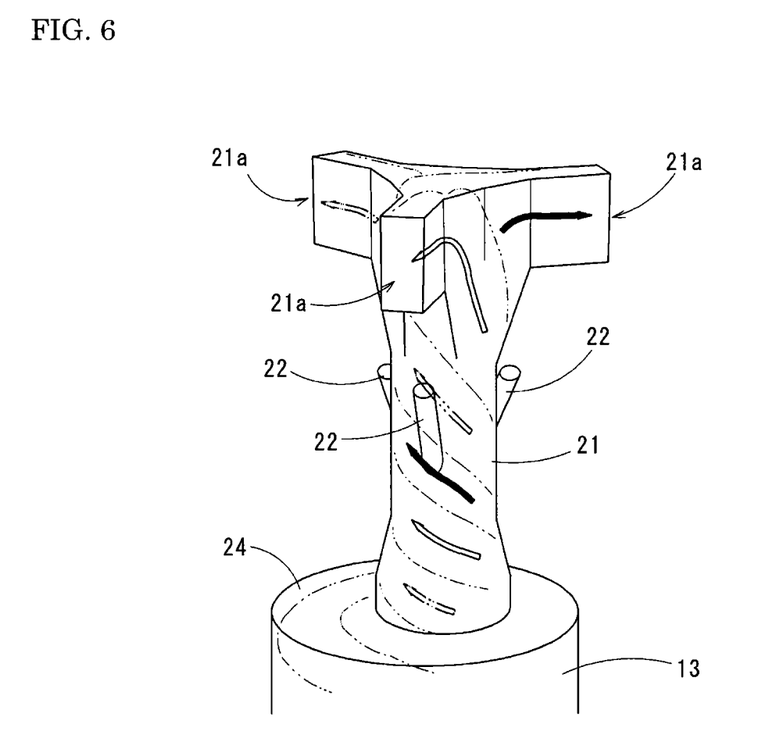
FIG. 6 It is a schematic view sterically showing a flow of exhaust gas in a duct in another embodiment of a cement production apparatus according to the present invention, which is an example of a duct having three distribution outlets.
Figure 7:
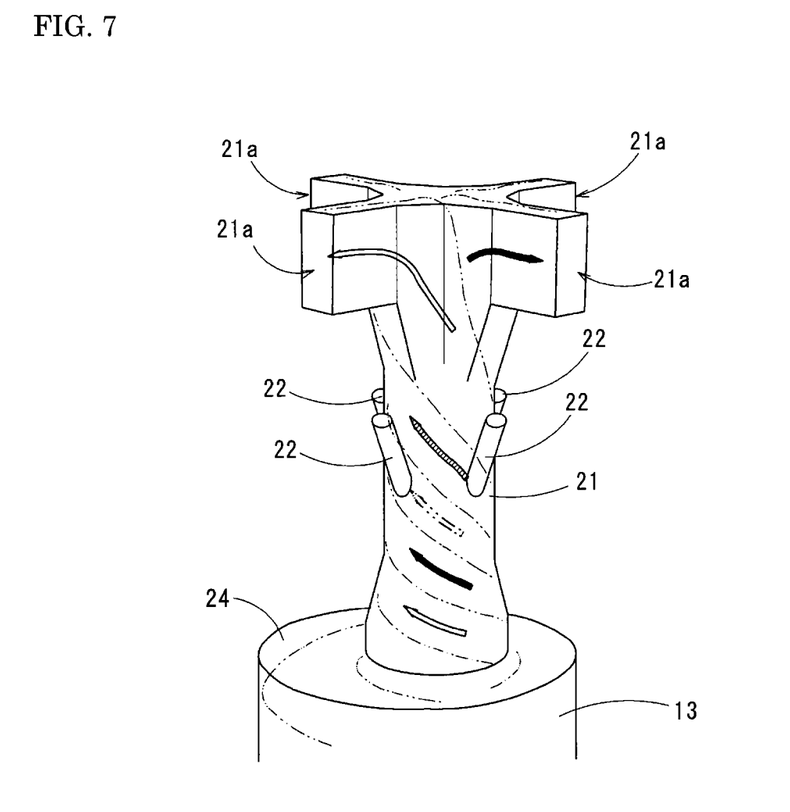
FIG. 7 It is a schematic view sterically showing a flow of exhaust gas in a duct in another embodiment of a cement production apparatus according to the present invention, which is an example of a duct having four distribution outlets.

In a case in which three or more cyclones are provided, as shown in FIG. 6 and FIG. 7, swirl flows are generated corresponding to a number of the distribution outlets 21a in the duct 21.

In this case, the connecting ports 22a of the material-supplying pipes 22 to the duct 21 are arranged by one at positions corresponding to the swirl flows flowing of the exhaust gas into the distribution outlets 21a respectively, so that the dropped material is supplied equally to the upper cyclones from the distribution outlets 21a with being carried by the swirl flows. In an example shown in FIG. 6, from the material-supplying pipes 22 which are arranged with being shifted each other by 120°, the cement raw material is supplied to the three swirl flows respectively and supplied equally to the upper cyclones from the distribution outlets 21a by being carried by the flows. In an example shown in FIG. 7, from the material-supplying pipes 22 which are arranged with being shifted each other by 90°, the cement raw material is supplied to the four swirl flows respectively and supplied equally to the upper cyclones from the distribution outlets 21a by being carried by the flows.

That is, by arranging the material-supplying pipes 22 with being shifted each other by 360°/n corresponding to the number "n" of the distribution outlets 21a among the upper cyclones, the cement raw material can be supplied equally to the upper cyclones by being carried by the swirl flows.

Figure 4:
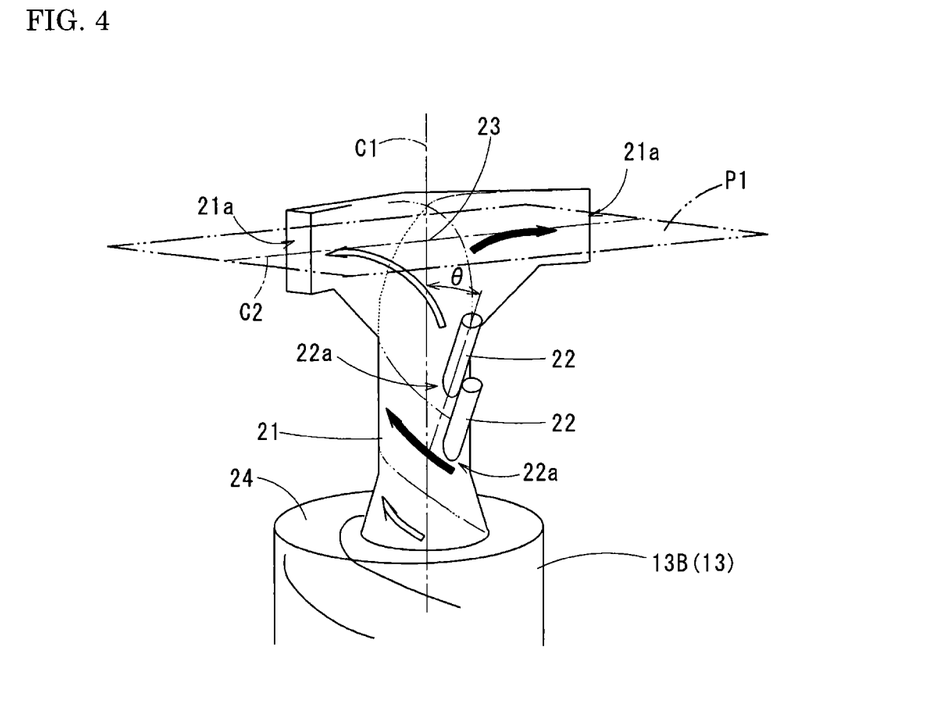
FIG. 4 It is a schematic view sterically showing a flow of exhaust gas in a duct in a second embodiment of a cement production apparatus according to the present invention.

FIG. 4 shows a second embodiment of a cement production apparatus according to the present invention.

As the cement production apparatus shown in FIG. 4, the connecting ports 22a of the material-supplying pipes 22 may be arranged by two with being vertically separated by a prescribed space at one side surface of the duct 21 so as to be arranged by one at positions corresponding to two swirl flows of the exhaust gas. Also in this case, the cement raw material can be supplied to the two flows from the material-supplying pipes 22 respectively. The cement raw material supplied to the two flows is carried by the flows and supplied to the upper cyclones 13A. Therefore, the cement raw material can be flown-out equally to the distribution outlets 21a among the upper cyclones 13A, thereby pre-heating equally and improving the heat-exchange efficiency.

In a case in which the material is supplied with being distributed among three or more cyclones, by arranging the material-supplying pipes 22 with being vertically separated by a prescribed space at one side surface of the duct with the number of "n" corresponding to the number "n" of the distribution outlets among the upper cyclones, it can be arranged by one at a position corresponding to the swirl flow respectively.

Positions of the connecting ports of the material-supplying pipe to the duct are decided in practice by altering the connecting position of the material-supplying pipe according to the temperature difference between the distribution outlets so as to correspond to the respective swirl flows. Specifically, there are a method using computer simulation, a method using a cold testing apparatus, a method altering a connecting position while monitoring temperature difference between the distribution outlets in actual equipment, and the like. Below, a result of simulating the connecting positions of the material-supplying pipes which can throw the cement raw material into the two swirl flows will be described.

A duct model in simulation was set to have a structure shown in FIG. 1, in which the two distribution outlets 21a among the top cyclones are provided and the connecting ports 22a of the material-supplying pipes 22 are arranged opposed to each other with being shifted each other by 180° around the axis of the duct 21. H was a vertical distance between a horizontal surface P1 passing through centers of the distribution outlets 21a of the upper cyclones and a horizontal surface P2 passing through centers of the connecting ports 22a of the material-supplying pipes 22. Five types of the duct models were configured to have a ratio H/D in which the vertical distance H and a diameter D of the duct, 1.07, 1.47, 1.84, 2.22, and 2.68, and thermal fluid simulation was performed for those ducts. The temperature differences were obtained by calculating temperature at left-and-right distribution outlets of the duct after flowing through the distribution part. Also, by calculating rates of the cement raw material flown-out from the left-and-right distribution outlets of the duct, rate differences thereof were obtained.

As conditions of the simulation, a preheater in a cement kiln having an amount of production of clinker 200 ton/h was assumed. In this preheater, to a third cyclone, gas was supplied with gas volume of 14300 $Nm^3$/h and temperature of 640° C.; and to the material-supplying pipe, gas was supplied with gas volume of 1400 $Nm^3$/h and temperature of 80° C. An inclined angle θ of the material-supplying pipes 22 were set to 35°. Result was shown in Table 1 and FIG. 5. A vertical axis in FIG. 5 is temperature difference of the exhaust gas between the left-and-right distribution outlets.

TABLE 1

| RATIO H/D | TEMPERATURE DIFFERENCE BETWEEN DISTRIBUTION OUTLETS (° C.) | FLOWN-OUT MATERIAL RATE (%) | | FLOWN-OUT MATERIAL RATE DIFFERNCE (%) |
|---|---|---|---|---|
| | | RIGHT OUTLET | LEFT OUTLET | |
| 1.07 | 48.8 | 73.8 | 26.2 | 47.6 |
| 1.47 | 10.7 | 52.6 | 47.4 | 5.2 |
| 1.84 | 0.7 | 51.0 | 49.0 | 2.0 |
| 2.22 | 5.8 | 48.7 | 51.3 | 2.5 |
| 2.68 | 15.5 | 57.7 | 42.3 | 15.5 |

Figure 5:
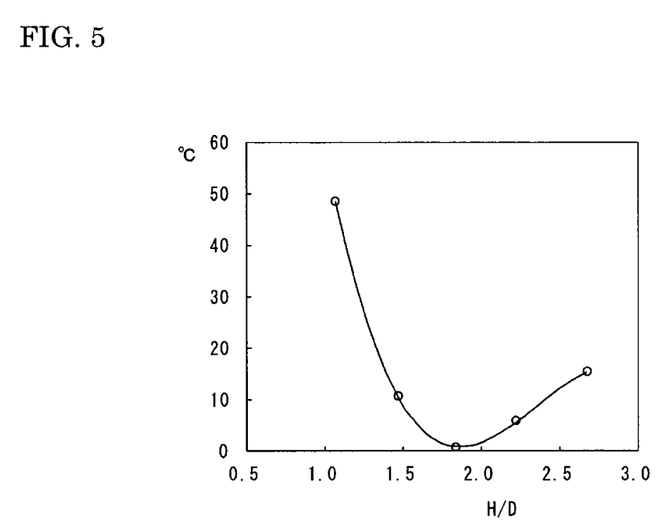
FIG. 5 It is a graph showing an analysis result of a relationship between temperature difference at distribution outlets of exhaust gas and a ratio H/D of a vertical distance from a plane including a distribution part to tip ends of the material-supplying pipes with respect to an inner diameter of the duct.

As clear from the result shown in Table 1 and FIG. 5, the temperature difference between the distribution outlets was smaller; the rate difference of the flown-out material between the distribution outlets was smaller, so that the pre-heating state of the cement raw material was able to be equalized. In a practicable range of the ratio H/D (1.1 to 3.0), the temperature difference between the distribution outlets can be 50° C. or less.

It is desirable to arrange the connecting ports of the material-supplying pipes at positions in which the ratio H/D is set to 1.4 to 2.7 since the temperature difference of the exhaust gas between the left-and-right distribution outlets is 20° C. or less and the rate difference of the flown-out material can be lower.

Moreover, it is more desirable to arrange the connecting ports of the material-supplying pipes at positions in which the ratio H/D is set to 1.5 to 2.4 since the temperature difference of the exhaust gas between the left-and-right distribution outlets is 10° C. or less and the rate difference of the flown-out material can be lower.

The present invention is not limited to the above-described embodiments and various modifications may be made without departing from the scope of the present invention.

For example, though it was explained to supply the material to the duct that was connected to the cyclone 13A of the top stage, the present invention can be employed for a case in which the material is supplied to the ducts to the cyclones which are provided in plural at each of the stages, or to a rising duct 25 (refer to FIG. 3) connecting the lowest cyclone 13D and the kiln inlet part 6 of the cement kiln.

Moreover, the present invention can be employed not only for supplying raw material sent from a mill as cement raw material, but also for a case for supplying material while being pre-heated after flowing through the upper cyclone.

In the above embodiments, the cement raw material is supplied equally from the material-supplying pipes 22 and carried by the swirl flows. However, it is possible to employ a structure in which a supply-amount controller is provided at an upper stream position above the material-supplying pipes 22 to control the supply-amounts of the cement raw material to the material-supplying pipes 22. In this case, the supply-amounts of the cement raw material supplied to the material-supplying pipes 22 can be controlled to be distributed, so that temperatures of the cement raw material supplied to the distribution outlets 21*a* can be equalized by pre-heating.

INDUSTRIAL APPLICABILITY

It can be applied for a cement production apparatus that produces cement clinker by burning cement raw material in a kiln while supplying to a preheater.

DESCRIPTION OF REFERENCE SYMBOLS

3 preheater
4 cement kiln
6 kiln inlet part
13, 13A to 13D cyclone
21 duct
21*b* inner wall surface
22 material-supplying pipe
23 distribution part
24 upper end
25 rising duct

What is claimed is:

1. A cement production apparatus comprising:
    a plurality of cyclones vertically connected to each other in which exhaust gas generated in a cement kiln flows;
    a duct provided between the upper cyclones and the lower cyclone being provided below the upper cyclones, the duct in which the exhaust gas drained from the lower cyclone flows upward, distributing and introducing the exhaust gas to the upper cyclones;
    a plurality of material-supplying pipes for supplying cement raw material provided on the duct below a distribution part among the plurality of the upper cyclones with a same number of distribution outlets among the upper cyclones; and
    connecting ports of the material-supplying pipes to the duct each provided at each of positions corresponding to swirl flows of the exhaust gas poured into the distribution outlets.

2. The cement production apparatus according to claim 1, wherein when the number of the distribution outlets among the upper cyclones is "n", the connecting ports of the material-supplying pipes are arranged around an axis of the duct with being shifted each other by 360°/n.

3. The cement production apparatus according to claim 2, wherein:
    the upper cyclones are provided with two; and
    the material-supplying pipes are connected positions separated by 180° around the duct.

4. The cement production apparatus according to claim 2, wherein when a vertical distance between a horizontal surface passing through centers of the distribution outlets of the upper cyclones and a horizontal surface passing through centers of the connecting ports of the material-supplying pipes is H, and a diameter of the duct is D, a ratio H/D is set to 1.1 to 3.0.

5. The cement production apparatus according to claim 1, wherein when a number of the distribution outlets among the upper cyclones is "n", the connecting ports of the material-supplying pipes are arranged with being vertically separated by a prescribed space at one side surface of the duct with the number of "n".

6. The cement production apparatus according to claim 1, wherein the material-supplying pipes are inclined by an angle of 20° to 50° with respect to an axis of the duct.

7. The cement production apparatus according to claim 1, wherein the connecting ports of the material-supplying pipes are flush with an inner wall surface of the duct.

* * * * *